J. ROBINSON.
ELECTROMAGNETIC WAVE NAVIGATIONAL SYSTEM.
APPLICATION FILED DEC. 16, 1919.
1,357,210.
Patented Oct. 26, 1920.
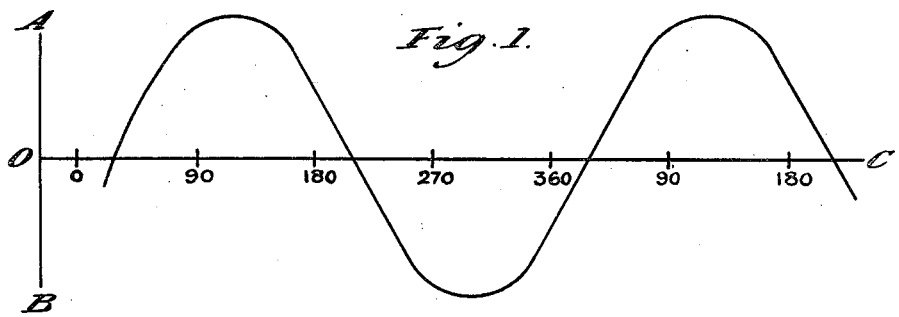
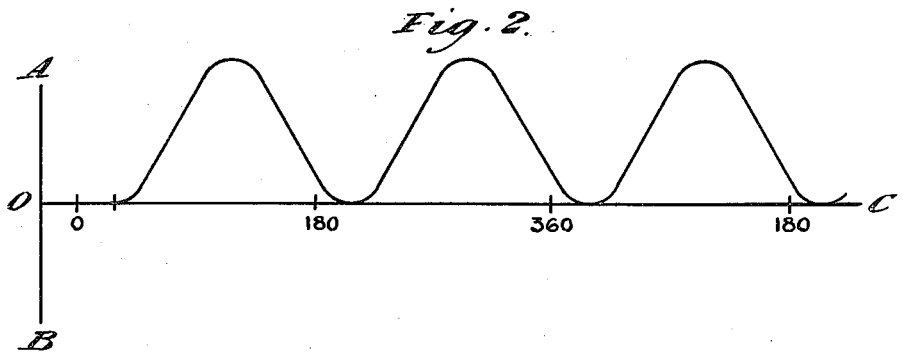
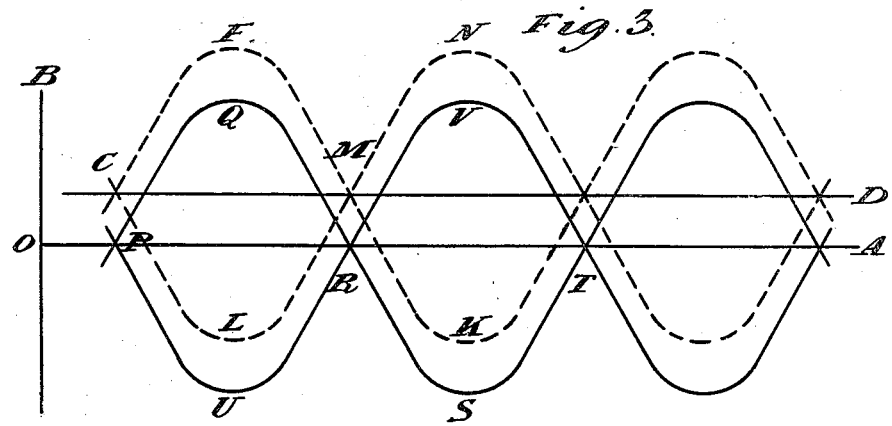
Witnesses:
C. R. Culligan
Inventor
James Robinson
by
Attorney

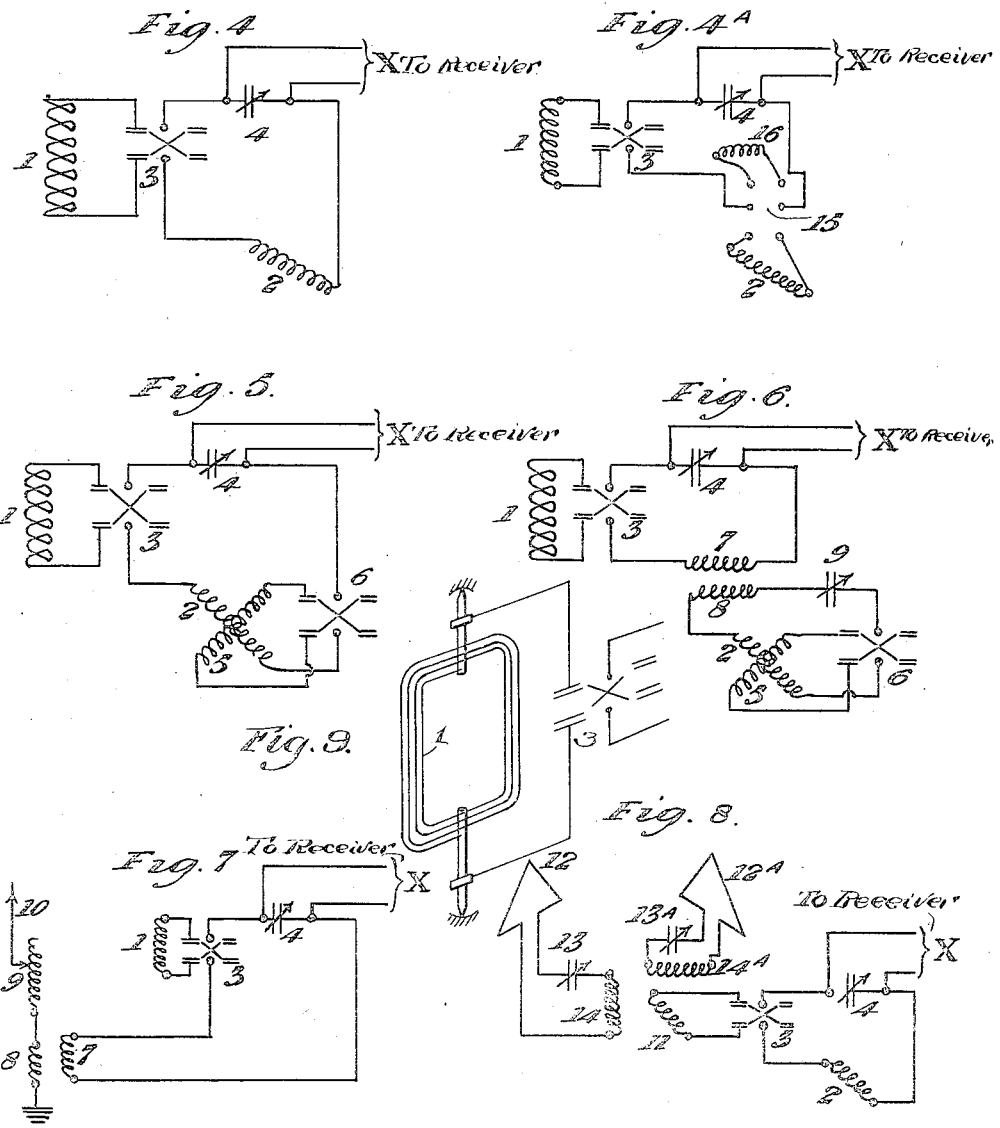

UNITED STATES PATENT OFFICE.

JAMES ROBINSON, OF BIGGIN HILL, ENGLAND.

ELECTROMAGNETIC-WAVE NAVIGATIONAL SYSTEM.

1,357,210.   Specification of Letters Patent.   Patented Oct. 26, 1920.

Application filed December 16, 1919. Serial No. 345,348.

*To all whom it may concern:*

Be it known that I, JAMES ROBINSON, a subject of the King of Great Britain, residing in Biggin Hill, England, have invented certain new and useful Improvements in Electromagnetic - Wave Navigational Systems, of which the following is a specification.

This invention relates to electromagnetic arrangements for navigational purposes, whereby the direction of transmission of electromagnetic waves from some remote point may be determined.

The improvements in directive wireless systems which constitute the present invention are applicable either to transmission or reception, but are herein more particularly described with reference to reception arrangements.

Various methods have been suggested whereby the direction of the source of wireless signals may be determined by their effect on a suitably placed aerial coil or coils. While a bearing can be obtained by these systems with a certain accuracy by taking advantage of the fact that the rate of variation of intensity of the signal is a maximum when the sound is at its minimum, this minimum corresponding as is known to a definite predetermined relative position of the coil to the direction of the said wave, it is impossible to appreciate or interpret any message which may be included in the said signals.

By the minimum method of determining direction of waves it is customary to swing the coil through the minimum and to note the positions on both sides of the minimum when the signal can just be heard. The mean of these two readings is taken as the minimum position.

In many cases there are other drawbacks to this minimum method; for instance, when there are external noises, as on aircraft. Such external noises widen the region in which the signals cannot be heard and, consequently, diminish the accuracy of reading.

A method is known by which it is possible to determine the minimum of the received signal and at the same time to hear the signal. This method is as follows:—Two coils are rigidly fixed at right angles to each other and rotatably mounted about a vertical axis; one coil alone is first used and may be called the "main" coil. This is set approximately in the position which gives the maximum of the signal, and then the second coil, which may be called the "auxiliary" coil, is introduced into the circuit and its connections reversed from time to time. If the main coil is truly at its maximum the auxiliary coil will be at its minimum or zero value and reversing these connections will produce no change in intensity of signal. If, however, the main coil is some small distance from its maximum, the auxiliary coil will not be at its zero position and reversing the connections of the auxiliary coil will produce a change in intensity of signal; hence, the final adjustment is made by moving the coils until there is no change of intensity of the signal on reversing the auxiliary coil.

The object of this invention is so to combine a receiving system giving a constant signal with a direction finding system giving a signal which varies in intensity according to the angle at which the waves strike the receiving aerial, that the minimum signal is audible in the receivers. The constant signal thus introduced may be considered to replace the signal obtained by the main coil in the system above described.

To these ends my invention broadly consists in combining a directive system with a non-directive system so that the intensity of the minimum signals observed is above a certain predetermined minimum value when the position of the directive system for minimum signals has been found, and not zero as would be the case under the same conditions when a directive system alone is used.

More particularly my invention consists in superimposing in a receiver a signal of constant value and a signal of varying value received by means of a directive system, and in order that details of my invention may be more clearly understood, reference is made to the accompanying diagrammatic drawings, in which Figures 1, 2 and 3, show graphically the state of the signals in relation to the angles of orientation of the directive coil, Figs. 4–8 show various arrangements for obtaining the desired combination of signals as shown in Fig. 3, and Fig. 9 is a diagrammatic perspective view corresponding with Fig. 4 and showing generally an arrangement of the rotatable coil in Figs. 4 to 8.

Using the minimum direction finding methods hitherto known for determining the direction of waves, such as the Bellini Tosi, the single rotating coil or like methods, the curve of received electro-motive force in relation to the angle of orientation of the direction finding coil is as shown in Fig. 1, in which AB denotes electro-motive force and OC angle of orientation of the coil. As, however, what is actually observed is intensity of sound in the telephone receiver, the intensity of sound in relation to orientation of the coil will be as shown in Fig. 2. Now, if some means of producing a constant intensity of signal as, for instance, a plain aerial or a loop aerial, and some means for producing the simple direction finding curve as shown in Figs. 1 and 2, are combined, the electromotive forces produced due to the combination of the two sets will be as shown in Fig. 3 in which the angle of orientation of direction finding system is shown along OA and the electromotive forces received along OB. CD shows the constant electromotive force produced by the constant signal system. The curve PQRST shows the electromotive force produced by the direction finding system. The curve PURVT shows the electromotive force produced when the direction finding system is reversed; combining the effects of the constant source of electromotive force and the electromotive forces due to the direction finding system in the receiver, the combined electromotive forces in the receiver due to curve CD and curve PQRST may be represented by curve FMK and the combined electromotive force curve due to curve CD and curve PURVT may be shown as curve LMN. The curves FMK and LMN cut each other at M, that is at an angle of orientation coinciding with the angle of orientation of the direction finding coils for zero electromotive force, when used without the non-directive system. Hence, we can determine the zero of the direction finding coil or coils while signals are audible.

Various methods of effecting this are shown in Figs. 4–9 in which like numbers denote like parts. In Fig. 4 a rotatable aerial coil 1 is connected through a reversing switch 3 with the aerial tuning condenser 4 and aerial coil 2 provided to supply the constant signal. Coil 2 is adjusted until the minimum signal is of desired intensity. The receiver or amplifier is connected across the aerial tuning condenser in the usual manner, here shown by leads X.

Provision may be made to cut out the source of constant signals when for any reason it is not required and this can be effected as shown in Fig. 4ᴀ. An inductance 16 equal in value to the aerial coil 2 may be substituted for the aerial coil 2 by means of a switch 15, leaving the tuning of the aerial circuit unaffected. It will be obvious that inductance 16 should be of smallest possible dimensions in order that no appreciable signals are produced by it.

In Fig. 5 the aerial producing the constant signal is shown as two fixed aerial coils 2 and 5 at right angles to each other; the coils 2 and 5 are connected in series and a reversing switch 6 is provided in order that a constant signal may be obtained from whatever direction the waves may emanate.

Fig. 6 shows a modification of the arrangement shown in Fig. 5, the constant signal aerial 2, 5 being inductively coupled to the directive aerial circuit by coils, 8 and 7, which are preferably adjustable in any usual manner so as to vary the degree of coupling. The circuit further comprises a tuning condenser 9.

Fig. 7 shows another alternative arrangement in which in series with a plain aerial 10, tuning inductance 9 is coupled with the directive aerial circuit by means of inductance coils 8, 7.

In the modification shown in Fig. 8 the constant signal system of Fig. 4 is applied to a special arrangement of aerial circuits known as a radiogoniometer. The rotatable aerial coil 1 in Fig. 4 is replaced by the rotatable coil 11 of such a device 12 and 12ᴀ, are the two aerials, 13 and 13ᴀ the tuning condensers and 14 and 14ᴀ the inductances of a radiogoniometer system.

Having thus described the nature of the said invention and the best means I know of carrying the same into practical effect, I claim:—

1. A directive wireless system comprising an aerial having one member adapted to produce signals of substantially constant intensity at a receiving station and a second member movably mounted with respect to the aforesaid member so that the signals due to it will vary from a maximum to a minimum according to the position to which it is adjusted, and means for determining its position of minimum intensity by adding and subtracting the effects due to one member to and from the effects due to the other member.

2. A directive wireless system comprising a receiving aerial, one member of which is movable with respect to the remainder of the aerial system and can be adjusted to positions so that the oscillations induced therein by electromagnetic waves range from a maximum to a minimum, a second member which is set so that the oscillations induced therein by the electromagnetic waves produce in the receiver a signal of audible and constant, or approximatedly constant, intensity, and means for determining the position of minimum intensity for the first receiving member by adding and subtracting the effects of the first-named oscillations on the receiver to and from those of the second-named oscillations.

3. In a directive wireless system comprising an aerial having one member adapted to produce signals of substantially constant intensity at the receiving station, and a second member movably mounted with respect to the aforesaid member, so that the signals due to it will vary from a maximum to a minimum according to the position to which it is adjusted, the method of determining the position of minimum intensity for said second member which consists in adding and subtracting the effects due to one member to and from the effects due to the other member.

In testimony whereof I have signed my name to this specification.

JAMES ROBINSON.